Aug. 22, 1933.　　　　R. C. PIERCE　　　1,923,841
SAFETY BRAKE BEAM SUPPORT FOR CAR TRUCKS
Filed Dec. 11, 1930　　2 Sheets-Sheet 1
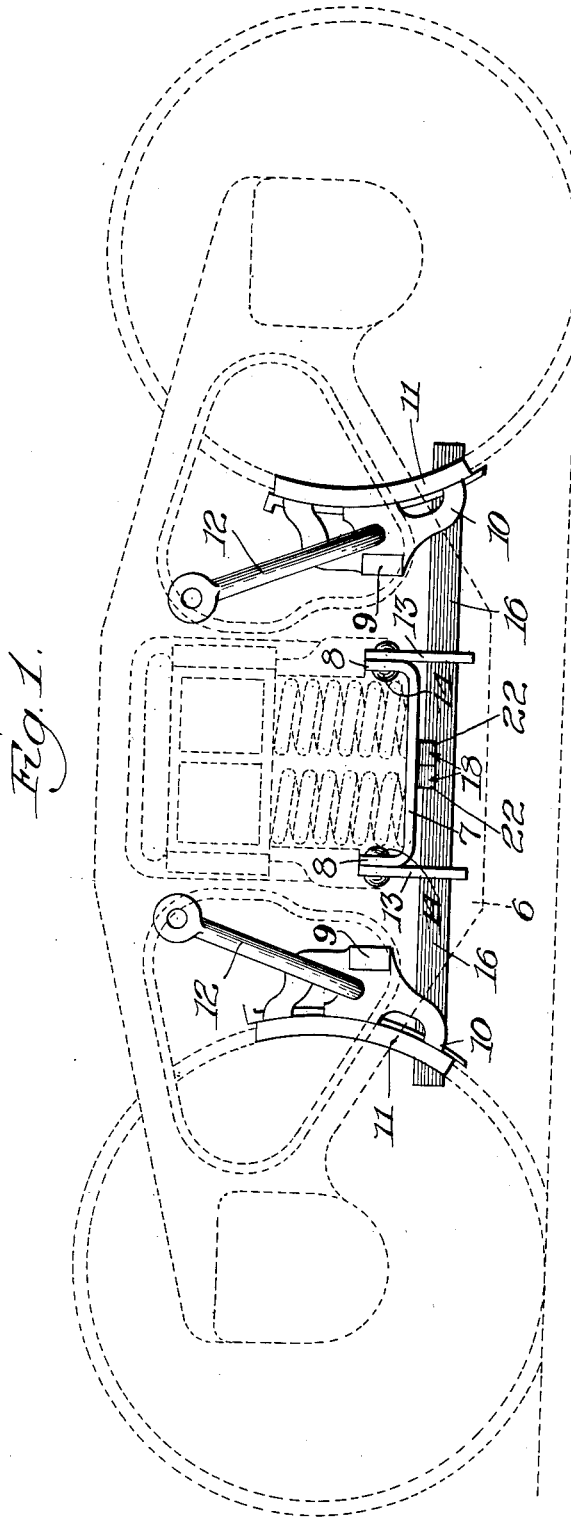
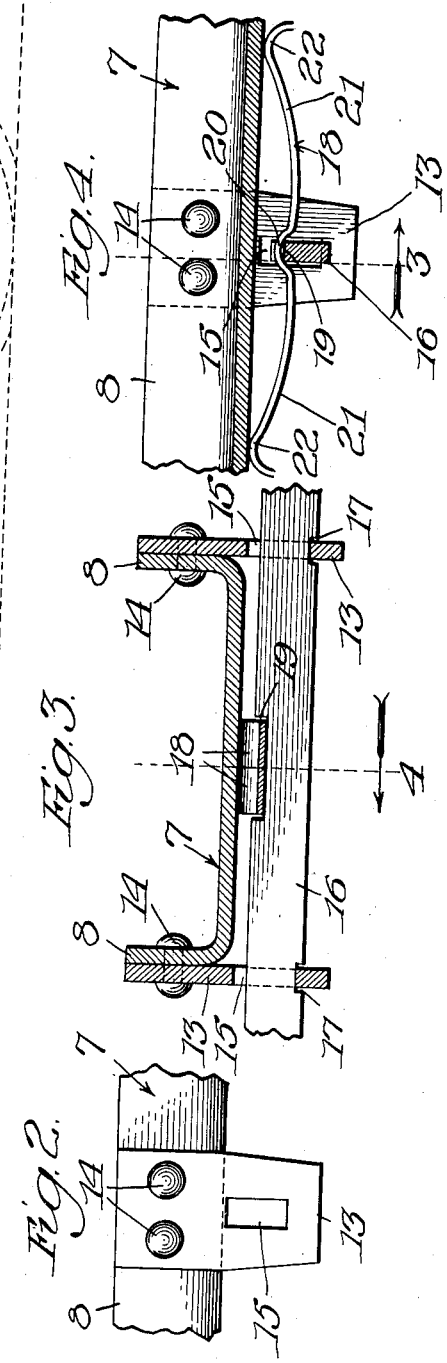
Inventor:
Raymond C. Pierce
By Dyrenforth, Lee, Chritton & Wiles
Attys.

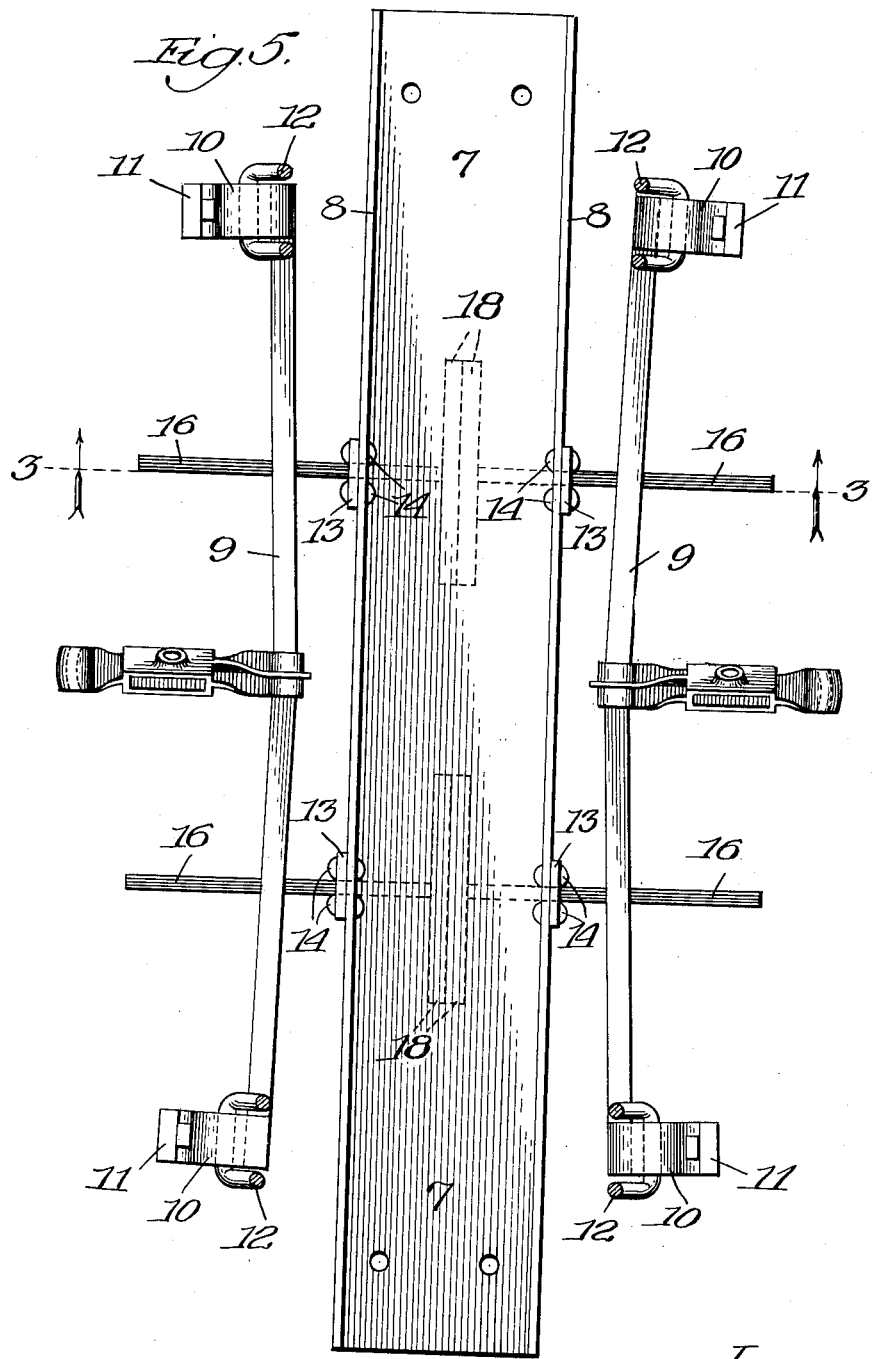

Patented Aug. 22, 1933

1,923,841

UNITED STATES PATENT OFFICE 1,923,841

SAFETY BRAKE-BEAM SUPPORT FOR CAR TRUCKS

Raymond C. Pierce, Chicago, Ill., assignor to General American Tank Car Corporation, Chicago, Ill., a Corporation of West Virginia Application December 11, 1930
Serial No. 501,708

5 Claims. (Cl. 188—210)

My invention relates to means, commonly provided on car trucks, for preventing the brake-beams from falling onto the track in case any portion of the brake-rigging supporting the brake-beams, as for example, the brake-beam-supporting hangers, becomes broken, these means commonly comprising a bar secured to the spring plank of the truck to extend crosswise thereof, with its ends extending below the brake-beams cooperating with the wheels of the truck and in a position to arrest falling of the brake-beams should the parts supporting them break, and hold them elevated above the track, thus avoiding danger of impairment of the track and rolling stock, and averting accidents.

One of my objects is to provide a novel, simple and economical construction of safety means for the purpose above stated.

Another object is to provide a construction of safety means which may be easily and quickly assembled with the truck and disassembled therefrom when desired.

Another object is to dispense with the use of bolts or rivets engaging the truck for holding the safety bar in position.

Another object is to provide a construction whereby the safety bar may be readily released and shifted out of a position in which it obstructs free access to the brake-beam adjacent either end thereof; and other objects as will be manifest from the following description.

Referring to the accompanying drawings:

Figure 1 is a view in side elevation of the brake-beam-equipped truck of a railway car provided with safety brake-beam-supports in accordance with my invention, certain of the parts of the illustrated structure being shown by dotted lines.

Figure 2 is a broken view in side elevation of one end of the spring-plank.

Figure 3 is a broken cross-sectional view of the spring-plank and safety-bar assembly, the section being taken at the line 3 on Fig. 4 and the line 3—3 on Fig. 5 and viewed in the direction of the respective arrows.

Figure 4 is a broken view in longitudinal section of the assembly, the section being taken at the line 4 on Fig. 3 and viewed in the direction of the arrow; and Figure 5, a plan view of the spring-plank and safety-bar assembly.

In the construction shown, 6 represents one of the side-frames of a railway-car truck of a conventional form and 7 a spring-plank of a form commonly used and connecting together the side-frames of the truck, the spring-plank being shown as of channel-form presenting upwardly extending parallel flanges 8 at its opposite longitudinal edges and extending substantially from one truck side-frame to the other thereof.

The brake-beams commonly employed are represented at 9 these beams being located at opposite sides of the truck and each provided at its opposite ends with brake-heads 10 carrying brake-shoes 11 for cooperation with the wheels of the truck, the brake-beams 9 being swingably supported in accordance with common practice by means of hangers 12 pivoted at their upper ends to the truck-frame.

My improved safety means of the construction shown comprises spaced-apart pairs of plates 13 mounted on the spring plank and shown at located equidistantly from the ends of the plank. The plates of each pair are located at opposite sides of the spring-plank and are held in flatwise position against the outer sides of the flanges 8 as by rivets 14 each bar containing a vertically elongated slot 15 extending below the bottom of the spring-plank. The structure also comprises safety-bars 16 one for each pair of plates 13, which extend through the slots 15 in these plates and lengthwise of the car, the ends of these bars projecting beyond the spring-plank into a position in which they directly underlie the brake-beams 9, as shown, to form a support upon which the brake-beams, should either of the hangers 12 become broken, will drop and be held up thereby.

Each bar 16 is provided in its lower edge with a pair of notches 17 of a length substantially equal to the thickness of the plates 13 and so spaced apart as to register with these plates, the slots 15 being of a height substantially equal to the height of the bars 16.

As will be manifest the bars 16 are applied to operative position by sliding them endwise through the slots 15 to the position shown in which position the bars drop at their notches 17 over the bottom walls of the slots thereby so interlocking the bars and plates that the bars are held against longitudinal movement.

The bars 16 are held against upward displacement by means such as, and preferably, the spring means shown, these means for each bar 16 being shown as formed of two similar leaf springs 18 disposed side-by-side between the bottom of the spring-plank and the tops of the bars, the latter being notched as represented at 19 to receive the springs and prevent displacement of the latter lengthwise of the car.

Each spring 18 is preferably formed with an upwardly deflected portion 20 midway between its ends at which it straddles the top of the bar 16 for holding the spring against lengthwise displacement, the end portions of the spring being upwardly deflected as represented at 21 with its terminal ends, at which it bears under spring tension against the under side of the plank, downwardly curved as represented at 22.

By the construction shown the bars 16 and springs 18 are held under spring tension in operative position, and rattling of the parts, with objectionable noise and wear, is avoided.

The parts may thus not only be readily assembled, but readily disassembled even though the parts become rusted, inasmuch as no bolts are employed, the bars being released for withdrawal merely by driving the springs endwise out of operative position relative to the bars 16.

Furthermore, impacts against the ends of the bars 16 will not result in rendering the structure inoperative but will merely bend back the parts.

What I claim as new, and desire to secure by Letters Patent, is:

1. The combination of a railway-car truck having a spring-plank, a brake-beam adjacent said spring plank, said spring-plank having plate portions secured thereto at its opposite lateral sides with their ends depending below said plank, a brake-beam-support bar notched at its lower edge, said bar being supported on said portions with its notched portion interlocked with at least one of said plate portions to prevent lengthwise movement of said bar, and a leaf spring interposed between said plank and bar and bearing under spring tension downwardly against said bar for holding said bar against upward displacement, said spring having a deflected portion at which it straddles said bar.

2. The combination of a railway-car truck having a spring-plank, a brake-beam adjacent said spring plank, said spring-plank having depending portions, a brake-beam-support bar notched at its lower edge, said bar being supported on said portions with its notched portion interlocked with at least one of said portions to prevent lengthwise movement of said bar, the upper edge of said bar being notched, spring means interposed between said spring plank and bar and bearing under spring tension downwardly against said bar at the notch in its upper edge, and means for preventing displacement of said spring means crosswise of said bar.

3. The combination of a railway-car truck having a spring-plank, a brake-beam adjacent said spring plank, said spring-plank having depending portions, a brake-beam-support bar notched at its lower edge, said bar being supported on said portions with its notched portion interlocked with at least one of said portions to prevent lengthwise movement of said bar, the upper edge of said bar being notched, and spring means interposed between said plank and bar and bearing under spring tension downwardly against said bar at the notch in the upper edge of said bar, said spring having a deflected portion at which it straddles the upper edge of said bar.

4. The combination of a railway-car truck having a brake-beam, said truck having a portion containing vertical slots, a brake-beam-support bar having its lower edge notched and extending through said slots and interlocked at its notched portion with said portion of said truck, said slots being of such height that said bar may be introduced lengthwise into said slots, and spring means extending crosswise of the truck and operating to exert downward spring pressure against said bar.

5. The combination of a railway-car truck having a brake-beam, said truck having a portion containing vertical slots, a brake-beam-support bar having its lower edge notched and extending through said slots and interlocked at its notched portion with said portion of said truck, a spring extending crosswise of said bar and bearing downwardly against said bar, and means preventing longitudinal displacement of said spring crosswise of said bar.

RAYMOND C. PIERCE.